United States Patent [19]

Alonso et al.

[11] Patent Number: 5,542,112
[45] Date of Patent: Jul. 30, 1996

[54] METHOD AND APPARATUS FOR PROVIDING RELIABLE SIGNALLING TONES IN A RADIO COMMUNICATION SYSTEM

[76] Inventors: Leopold Alonso, 1552 W. Oakmont, Hoffman Estates, Ill. 60194; Timothy J. Wilson, 931 Canterbury Dr., Schaumburg, Ill. 60195; Paul M. Erickson, 965 S. Elm St., Palatine, Ill. 60067

[21] Appl. No.: 419,847

[22] Filed: Apr. 11, 1995

Related U.S. Application Data

[63] Continuation of Ser. No. 858,839, Mar. 27, 1992, abandoned.

[51] Int. Cl.⁶ .................................................. H04Q 7/28
[52] U.S. Cl. ........................... 455/54.1; 455/68; 379/63
[58] Field of Search ................................ 455/38.1, 38.5, 455/53.1, 54.1, 68, 69; 340/825.31, 825.34, 825.45, 825.48; 370/110.2, 110.3; 379/235, 237, 361, 63

[56] References Cited

U.S. PATENT DOCUMENTS

| | | | |
|---|---|---|---|
| 4,498,171 | 2/1985 | Munter et al. | 370/110.2 |
| 4,554,658 | 11/1985 | Marten et al. | 370/110.3 |
| 4,670,875 | 6/1987 | Nassar | 370/110.3 |
| 4,677,656 | 6/1987 | Burke et al. | 379/63 |
| 4,697,281 | 9/1987 | O'Sullivan | 455/69 |
| 4,797,947 | 1/1989 | Labedz | 455/69 |
| 4,813,040 | 3/1989 | Futato | 370/111 |
| 4,868,872 | 9/1989 | Roberts et al. | 340/825.48 |
| 4,885,577 | 12/1989 | Nelson | 340/825.48 |
| 4,941,203 | 7/1990 | Patsiokas et al. | 455/53.1 |
| 4,977,399 | 12/1990 | Price et al. | 455/67.4 |
| 5,228,026 | 7/1993 | Albrow et al. | 379/63 |
| 5,278,992 | 1/1994 | Su et al. | 455/69 |

FOREIGN PATENT DOCUMENTS

| | | | |
|---|---|---|---|
| 4040678 | 6/1992 | Germany | 379/63 |

*Primary Examiner*—Edward F. Urban
*Attorney, Agent, or Firm*—James A. Coffing

[57] ABSTRACT

A method of reliably transmitting signalling tones employs a radio communication unit suitable for encoding (303) data packets. The radio has a processor (101) for processing a first signal, which processing is incompatible for use with signalling tones. The radio further includes an input device (110) for providing signals when asserted. In a preferred embodiment, when the processor (101) is enabled to process the first signal, and a user does not assert the input device (110), the radio transmits the processed first signal. On the other hand, when the processor (101) is enabled, and the user asserts the input device (110), the radio transmits (304) repeated data packets, for the duration of the assertion, which identify a particular signalling tone.

22 Claims, 3 Drawing Sheets

5,542,112

METHOD AND APPARATUS FOR PROVIDING RELIABLE SIGNALLING TONES IN A RADIO COMMUNICATION SYSTEM

This is a continuation of application Ser. No. 07/858,839, filed Mar. 27, 1992 and now abandoned.

FIELD OF THE INVENTION

The present invention relates generally to radio communication systems, and more particularly to reliable transmission of signalling tones using such a system.

BACKGROUND OF THE INVENTION

In today's radio communications systems, there exists an ever increasing need to send signalling tones in addition to, and interspersed with, voice signals. In particular, dual tone multi-frequency (DTMF) signals are commonly used to provide input for interactive telephone services. Examples include so-called touch-tone banking transactions, entering employee phone extensions, telephone calling card digit entry, etc. In each of these examples, DTMF signalling tones are transmitted while the sending unit (e.g., radio) is configured in a voice processing mode (i.e., encoding circuitry configured to process voice signals for clear reception by the target user). Unlike the so-called call-setup mode (i.e., a configuration whereby signalling tones are directly sent, without further processing), voice processing (e.g., data compression, sampling, etc.) is incompatible for use in transmitting signalling tones (e.g., DTMF signals).

In addition to the aforementioned incompatibility, disturbances in the radio frequency (RF) path between the sending unit (e.g., subscriber radio) and the fixed end hardware—results in lost data. That is, even small discontinuities in the transmission of signalling tones might cause false tone detection at the receiving end. As an example of such a disturbance, consider a transmitting mobile radio travelling underneath a bridge, or other obstruction. Inasmuch as the RF path has been physically obstructed, the signal being transmitted might have discernable, and hence problematic, discontinuities.

Accordingly, a radio communication system which provides reliable transmission of signalling tones during a voice communication would be an improvement over the prior art. Such a radio communication system would, at least partially, resolve the problem of incompatibility between voice signalling and user entered signalling tones, thereby enhancing the utility of the system.

SUMMARY OF THE INVENTION

The present invention encompasses a method of more reliably transmitting signalling tones in a radio communication system. During a voice call, a radio processes a first signal (e.g., voice), which processing is incompatible for use with signalling tones (e.g., DTMF signals). The radio further includes input means for providing signals when asserted. In a preferred embodiment, when the processor is enabled to process the first signal, and a user does not assert the input means, the radio transmits the processed first signal. On the other hand, when the processor is enabled and the user asserts the input means, the radio transmits repeated data packets, for the duration of the assertion, which identify a particular signalling tone.

DETAILED DESCRIPTION OF A PREFERRED EMBODIMENT

Figure 1:
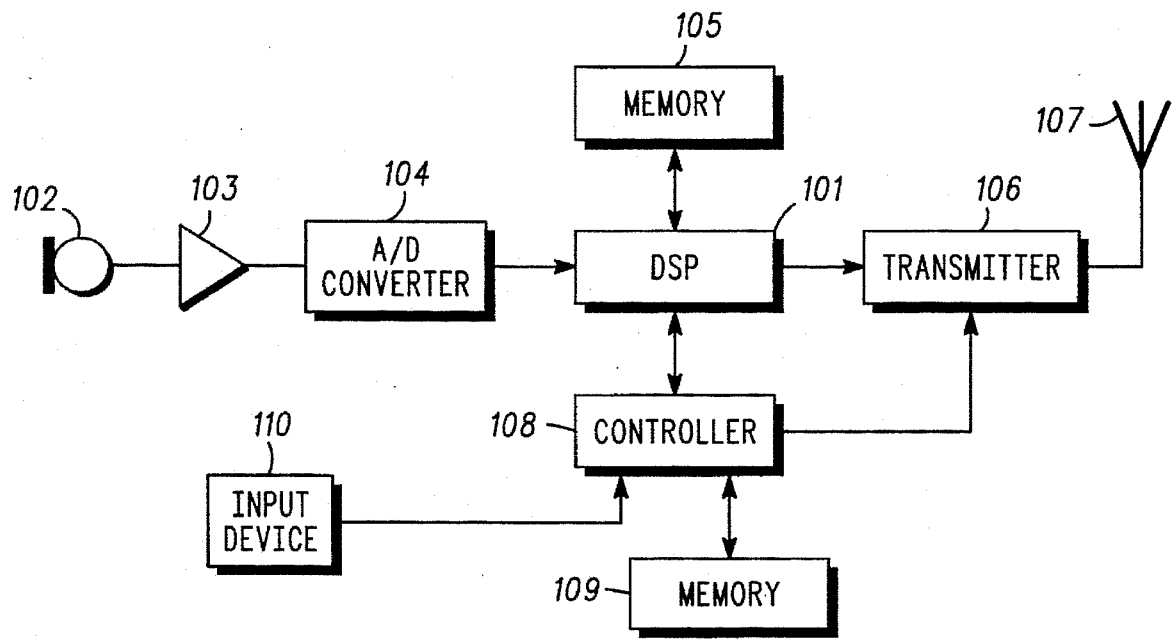
FIG. 1 is a simplified block diagram of a transmitter device in accordance with the present invention.

FIG. 1 shows a simplified block diagram of a transmitting device, in accordance with the invention. Digital signal processor (DSP, 101) processes, in a manner which is well known in the art, voice signals which are input from microphone 102. (It should be noted that while the primary purpose of DSP 101 is to reduce the data rate required to represent the voice signals, other processing might also be performed.) Voice signals are amplified and filtered by suitable analog circuitry 103, and converted to a substantially equivalent digital form by an analog-to-digital (A/D) converter 104. Software instructions used by DSP 101 to perform its processing are stored in memory 105. The resulting processed voice signal (e.g., in digital form) is presented to transmitter 106, which modulates the processed signal into a form suitable for radio frequency (RF) transmission to a target (e.g., fixed network equipment, or FNE), via antenna 107. DSP 101 and transmitter 106 are directed by controller 108, which might be a Motorola 68030 microprocessor, whose software instructions are stored in memory 109.

A user of the radio might, at certain times during a voice call, want to transmit signalling tones to the FNE. These signalling tones might be dual-tone multi-frequency (DTMF) signals, commonly used in telephone network systems, while other types of signalling tones might be appropriate elsewhere. The user controls transmission of the DTMF signals by means of a suitable input device 110, e.g., a touch-tone keypad similar to that commonly found on a telephone set. In the case of a keypad, the user depresses a particular key, indicating that a particular DTMF signal is to be transmitted. Further, the user might hold the selected key down, indicating that the DTMF signal is to be continually transmitted until the key is released.

In a preferred embodiment of the invention, a sending radio user asserts input device 110, e.g., by depressing a key. Subsequent to this event, controller 108 begins generating data packets, which contain an indication of the DTMF signal corresponding to the depressed key. (It should be noted that, in general, generation and transmission of data packets is well understood in the art.) Additionally, each data packet contains a temporal parameter, or time value, which parameter is used by the FNE to facilitate interpretation of the data packets, as later described. Generation and transmission of the data packets is repeated continuously as long as the user continues to assert the input device 110, e.g., depress the key.

Controller 108 passes the generated data packets to DSP 101, where they are transmitted to the FNE. While the data packet can be transmitted in many ways, a preferred method combines a portion (e.g., bits) of the data packets with a portion (e.g., bits) of the processed voice signal, for transmission on the same RF channel. This might be done, for example, by time-division multiplexing of the two data streams, or by replacing certain of the compressed voice bits with data packet bits. Alternatively, data packets might be transmitted on a separate RF channel than the one being used for transmitting the processed voice signal.

Figure 2:
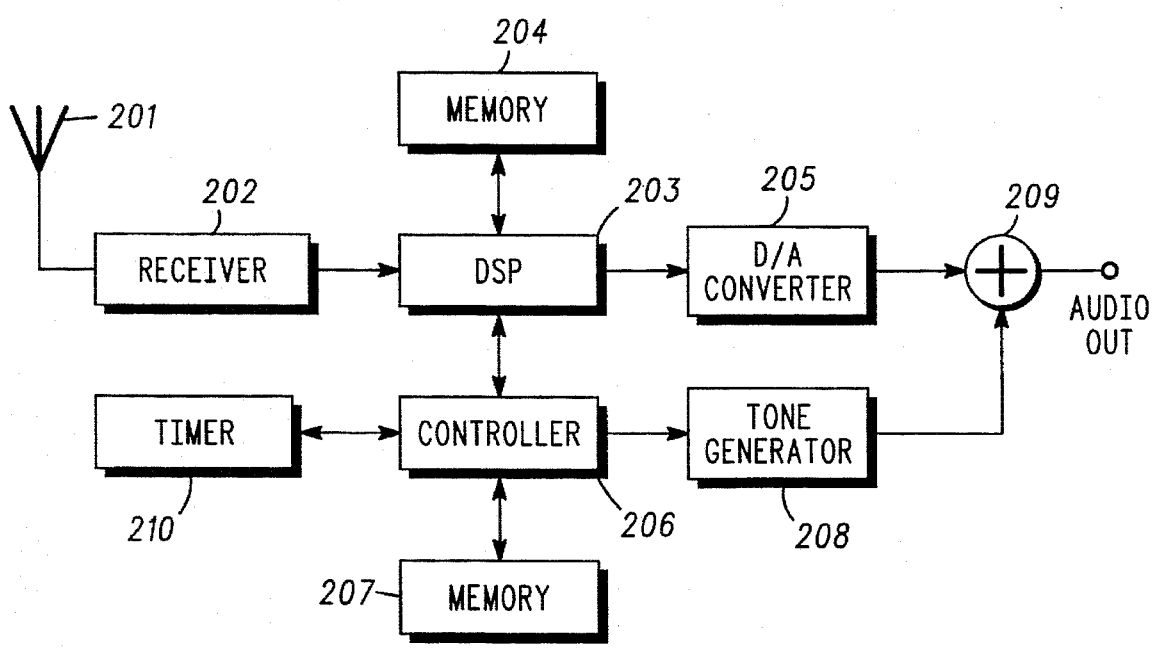
FIG. 2 is a simplified block diagram of a receiver device in accordance with the present invention.

FIG. 2 shows a simplified block diagram of a receiver device, in accordance with the invention. An RF signal, transmitted by the sending radio shown in FIG. 1, is received by antenna 201 and demodulated by receiver circuitry 202. A digital signal is thereby obtained which is suitable for processing by digital signal processor 203. Using algorithms stored in memory 204, DSP 203 processes the digital signal to recover the digital representation of the voice signal. The processed signal is then converted into analog form by digital-to-analog (D/A) converter 205.

In addition to voice processing, DSP 203 recovers the transmitted data packets, and passes them to controller 206. Controller 206 interprets the received data packets, using timer 210 as later described, and causes the tone generator 208 to generate the appropriate signalling tones (e.g., DTMF signals). Software instructions to direct the operation of controller 206 are stored in memory 207. The re-constructed signalling tones are then summed with the analog voice signal, using suitable analog circuitry 209, to produce an audio output, as shown. This composite audio signal might then be applied to the public switched telephone network (PSTN).

Figure 3:
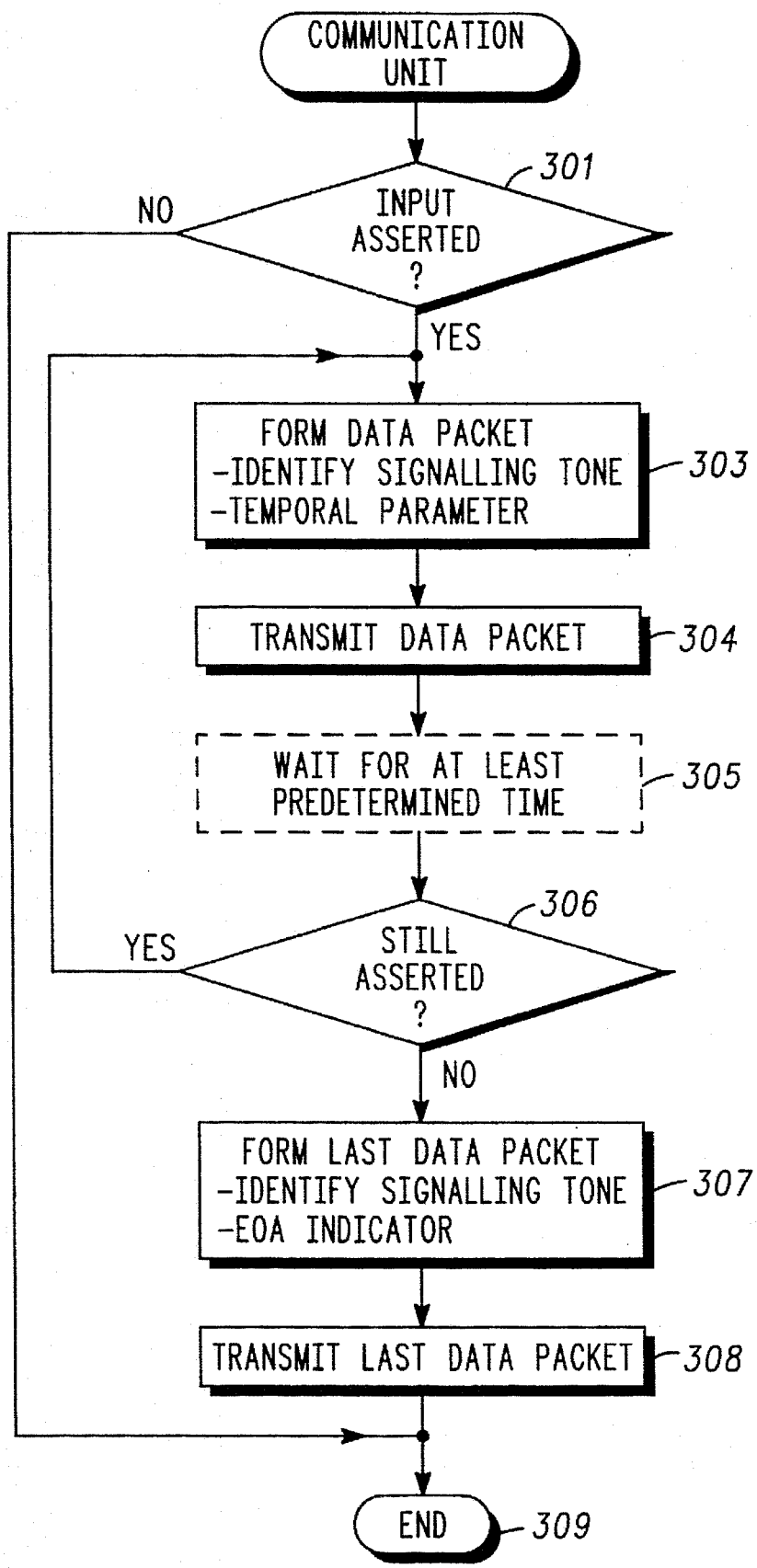
FIG. 3 is a simplified flow diagram depicting the operation of a communication unit, in accordance with the present invention.

FIG. 3 shows a simplified flow diagram depicting the operation of a sending communication unit, in accordance with the invention. At suitable intervals, the status of the input device is checked (301) to determine whether or not an input has been asserted (e.g., key depressed). If the input device has not been asserted, the routine is exited (309). If the user has asserted an input, a data packet is formed (303). The formed data packet includes an identification of the particular tone corresponding to the asserted input, and a pre-determined temporal value (the use of which is later described). The communication unit then transmits (304) the formed data packet, and waits (305) for at least a pre-determined time. After the wait period expires, controller 108 again checks (306) the status of the input device to determine whether or not it is still being asserted. If so, controller 108 forms and transmits another data packet, according to the procedure previously described. In this manner, data packets are repeatedly transmitted while the input device is being asserted.

When the input device is no longer being asserted, controller 108 forms (307) a last data packet, which includes an identification of the particular signalling tone, and an end-of-assertion (EOA) indicator. The EOA indicator can be realized using any number of schemes. For example, setting the temporal parameter to an otherwise unused value (e.g., zero), would suffice as such an indicator. The last data packet is then transmitted (308), before the routine is exited (309).

Figure 4:
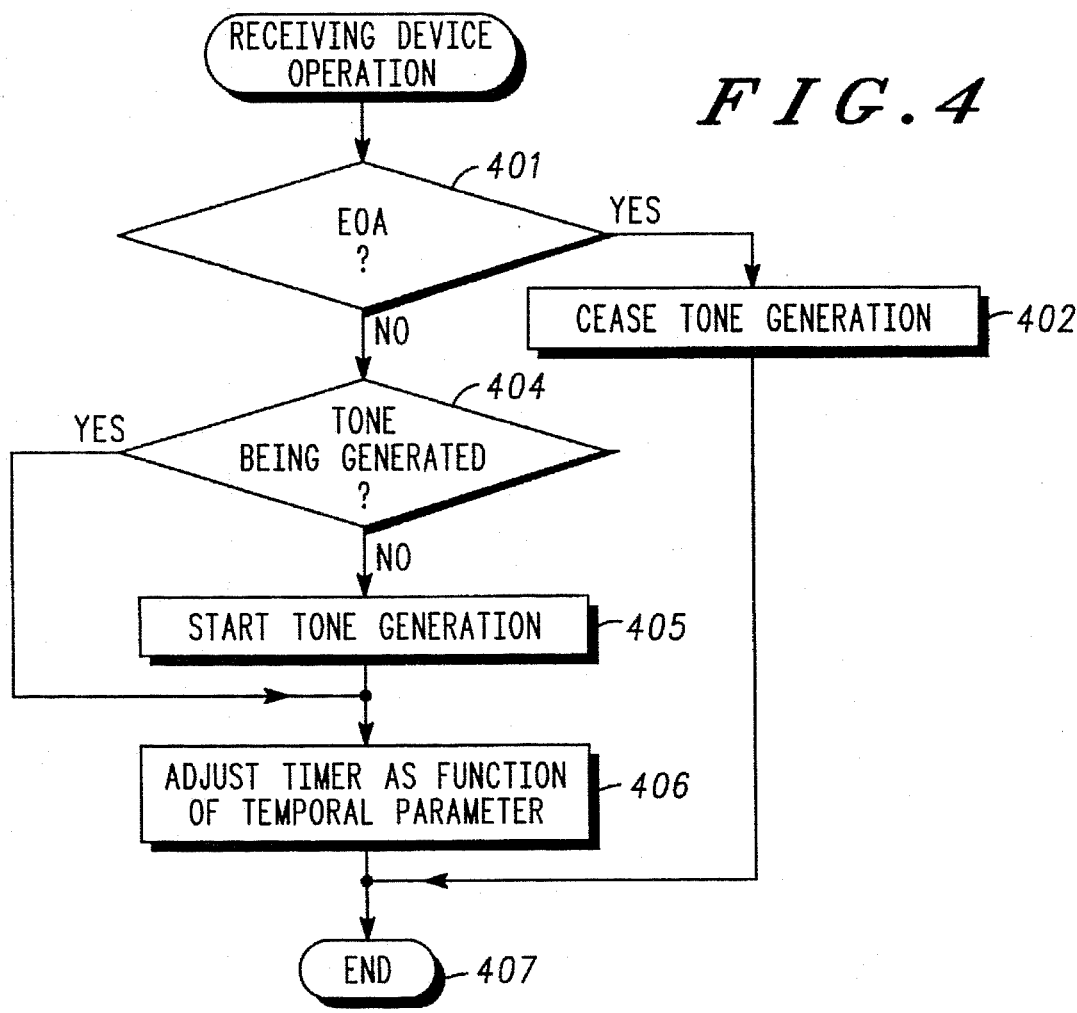
FIG. 4 is a simplified flow diagram depicting a portion of the receiver device operation, in accordance with the present invention.

FIG. 4 shows a simplified flow diagram depicting a preferred algorithm used in a receiving device, in accordance with the invention. After receiving a data packet, controller 206 checks (401) to determine whether or not the packet includes an end-of-assertion (EOA) indicator. If so (i.e., presumably a so-called last data packet), controller 206 directs tone generator 208 to cease (402) tone generation, and the routine is exited (407). If no EOA indicator is found in the data packet (i.e., presumably not the last data packet), controller 206 then checks (404) to determine whether or not a tone is currently being generated. If no tone is currently being generated, controller 206 starts generating (405) an appropriate tone, using the information included in the received data packet. Conversely, if a tone is currently being generated, tone generation simply continues.

At this stage of the processing, controller 206 adjusts (406) a timer (i.e., timer 210), according to the value of the temporal parameter included in the data packet. As an example, the temporal parameter might be a so-called hang time value, i.e., a value indicating how long the tone should be generated. In this embodiment, the timer might then be set to this value, thereby allowing a continuous tone generation even in the presence of discontinuous receive signals. After the timer is adjusted, the routine is exited (407).

Figure 5:
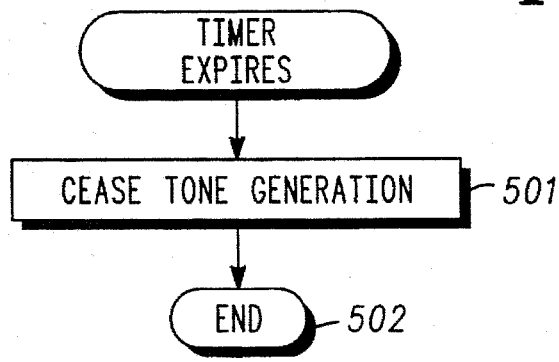
FIG. 5 is a simplified flow diagram depicting another portion of the receiver device operation, in accordance with the present invention.

Under normal operating conditions, tone generation is stopped upon receipt of a last data packet (i.e., data packet containing a predetermined EOA indicator). It is possible, however, for the last data to be lost in transmission (e.g., due to noise or other disturbances on the RF path). In this case, the tone might be stopped after the timer attains a predetermined value. Alternatively, tone generation might be stopped when the timer expires, as illustrated in FIG. 5. Upon expiration of the timer, controller 206 ceases (501) the tone generation, according to the method earlier described, and the routine is exited (502).

By way of the procedures herein described, the user of a communication unit is provided a means for reliably transmitting signalling tones during a voice call. These signals can be sent to the PSTN, along with voice signals, despite the fact that the processing applied to the voice signal is incompatible with transmission of the signalling tones. Further, generation of such tones can be made quite reliable, even though disturbances on the RF path may cause unpredictable loss of data.

What is claimed is:

1. A method of reliably providing signalling tones in a wireless communications environment, for use with a radio communication unit that is presently participating in an established call and that includes:

processing means for processing a first signal to provide a processed first signal, which means for processing is incompatible for use with signalling tones;

input means for providing signals when the input means is asserted; and wireless transmission means for transmitting information from the radio communication unit to a receiving unit;
the method comprising the steps of, during the established call:

A) when the processing means is currently enabled to process the first signal, and a user does not assert the input means, transmitting, via the wireless transmission means, the processed first signal to the receiving unit; and B) when the processing means is currently enabled to process the first signal, and a user asserts the input means for a duration, transmitting, via the wireless transmission means, repeated data packets for the duration that identify a signalling tone corresponding to an asserted input.

2. The method of claim 1, wherein step B includes:

B1) when the user discontinues asserting the input means, transmitting a last data packet that identifies the particular signalling tone.

3. The method of claim 2, wherein the last data packet includes an end-of-assertion indicator.

4. The method of claim 3, wherein at least some of the repeated data packets include a temporal parameter.

5. The method of claim 4, wherein step B includes:

B1) when the user discontinues asserting the input means, transmitting a last data packet that identifies the particular signalling tone.

6. The method of claim 5, wherein the last data packet includes an end-of-assertion indicator.

7. The method of claim 6 wherein the signalling tones comprise dual tone multi-frequency (DTMF) signals.

8. The method of claim 6 wherein step B further comprises the step of:

B1) combining the repeated data packets with the transmitted first signal.

9. A method of reliably providing signalling tones in a wireless communications environment, for use with a radio communication unit that is presently participating in an established call and that includes:

processing means for processing an audio signal to provide a processed audio signal, which means for processing is incompatible for use with signalling tones;

input means for providing signals when the input means is asserted; and wireless transmission means for transmitting information from the radio communication unit to a receiving unit;

the method comprising the steps of:

A) when the processing means is currently enabled to process an audio signal, and a user does not assert the input means, transmitting the processed audio signal, via the wireless transmission means; and B) when the processing means is currently enabled to process an audio signal, and a user asserts the input means for a duration, transmitting, via the wireless transmission means, repeated data packets for the duration that identify a signalling tone corresponding to an asserted input.

10. The method of claim 9, wherein step B includes:

B1) when the user discontinues asserting the input means, transmitting a last data packet that identifies the particular signalling tone.

11. The method of claim 10, wherein the last data packet includes an end-of-assertion indicator.

12. The method of claim 11, wherein at least some of the repeated data packets include a temporal parameter.

13. The method of claim 12, wherein step B includes:

B1) when the user discontinues asserting the input means, transmitting a last data packet that identifies the particular signalling tone.

14. The method of claim 13, wherein the last data packet includes an end-of-assertion indicator.

15. The method of claim 14 wherein the signalling tones comprise dual tone multi-frequency signals.

16. The method of claim 14 wherein the audio signal comprises a voice signal.

17. The method of claim 14 wherein step B further comprises the step of:

B1) combining the repeated data packets with the transmitted audio signal.

18. A method for use in a radio communication system having radio communication units that include:

processing means for processing a first signal to provide a processed first signal, which means for processing is incompatible for use with signalling tones;

input means for providing signals when the input means is asserted, and wherein the system further includes a receiver that receives transmissions from the radio communication units; and wireless transmission means for transmitting information from the radio communication unit to a receiving unit;

the method comprising the steps of:

at a first radio communication unit that is presently participating in an established call:

A) during the established call, when the processing means is currently enabled to process the first signal, and a user does not assert the input means, transmitting the processed first signal, via the wireless transmission means;

B) during the established call, when the processing means is currently enabled to process the first signal, and a user asserts the input means for a duration, transmitting, via the wireless transmission means, repeated data packets for the duration that identify a signalling tone corresponding to an asserted input; and at the receiver:

C) receiving, from the first radio communication unit, the transmitted processed first signal when the processed first signal has been transmitted; and D) receiving, from the first radio communication unit, the transmitted repeated data packets when the repeated data packets have been transmitted and generating, for the duration, an equivalent signalling tone in response thereto.

19. The method of claim 18, wherein step B includes the step of:

B1) when the user discontinues asserting the input means, transmitting a last data packet that identifies the particular signalling tone;

and wherein step D includes the step of:

D1) receiving the transmitted last data packet when the last data packet has been transmitted.

20. The method of claim 19, wherein at least some of the repeated data packets include a temporal parameter.

21. The method of claim 20, wherein the last data packet includes a temporal parameter.

22. The method of claim 21 wherein step B further comprises the step of:

B1) combining the repeated data packets with the transmitted audio signal.

* * * * *